United States Patent [19]

Zeligson

[11] Patent Number: 5,558,424
[45] Date of Patent: Sep. 24, 1996

[54] EMERGENCY VEHICLE LIGHT BAR ASSEMBLY

[76] Inventor: Stephen J. Zeligson, 1815 E. 31st Pl., Tulsa, Okla. 74105

[21] Appl. No.: 378,736

[22] Filed: Jan. 26, 1995

[51] Int. Cl.$^6$ .......................................... B60Q 1/00
[52] U.S. Cl. .................. 362/66; 362/74; 362/286; 362/386
[58] Field of Search .................. 362/35, 74, 286, 362/289, 386, 66; 340/463, 468

[56] References Cited

U.S. PATENT DOCUMENTS

| | | | |
|---|---|---|---|
| 2,738,492 | 3/1956 | Arneson et al. | 340/87 |
| 3,487,360 | 12/1969 | Thompson | 340/87 |
| 3,761,890 | 9/1973 | Fritts et al. | 340/135 |
| 3,783,267 | 1/1974 | Thomas | 240/57 |
| 4,447,042 | 5/1984 | Masui | 254/90 |
| 4,707,014 | 11/1987 | Rich | 362/74 X |
| 5,203,621 | 4/1993 | Weinmeister et al. | 362/66 |
| 5,304,993 | 4/1994 | Handsaker | 340/984 |
| 5,339,749 | 8/1994 | Hirose | 108/143 |

OTHER PUBLICATIONS

Brochure entitled Hi/Lo Lifesaver (Patent Pending); by Acme Precision Industries, Inc, No Publication Date.

*Primary Examiner*—Stephen F. Husar
*Attorney, Agent, or Firm*—Frank J. Catalano; Scott R. Zingerman

[57] ABSTRACT

An emergency vehicle light bar assembly employs first and second connected substantially horizontal elongated frames mounted transversely across the upper surface of an emergency vehicle. The connecting assembly is such that the second frame may be substantially continuously vertically displaced while maintaining parallel relationship of the frames so that the emergency indicating equipment fixed atop the second frame maintains its operational attitude regardless of the elevation to which the second frame is raised. Reciprocable operation of the connecting assembly may be accomplished by electric, hydraulic, pneumatic or manual drive systems.

13 Claims, 4 Drawing Sheets

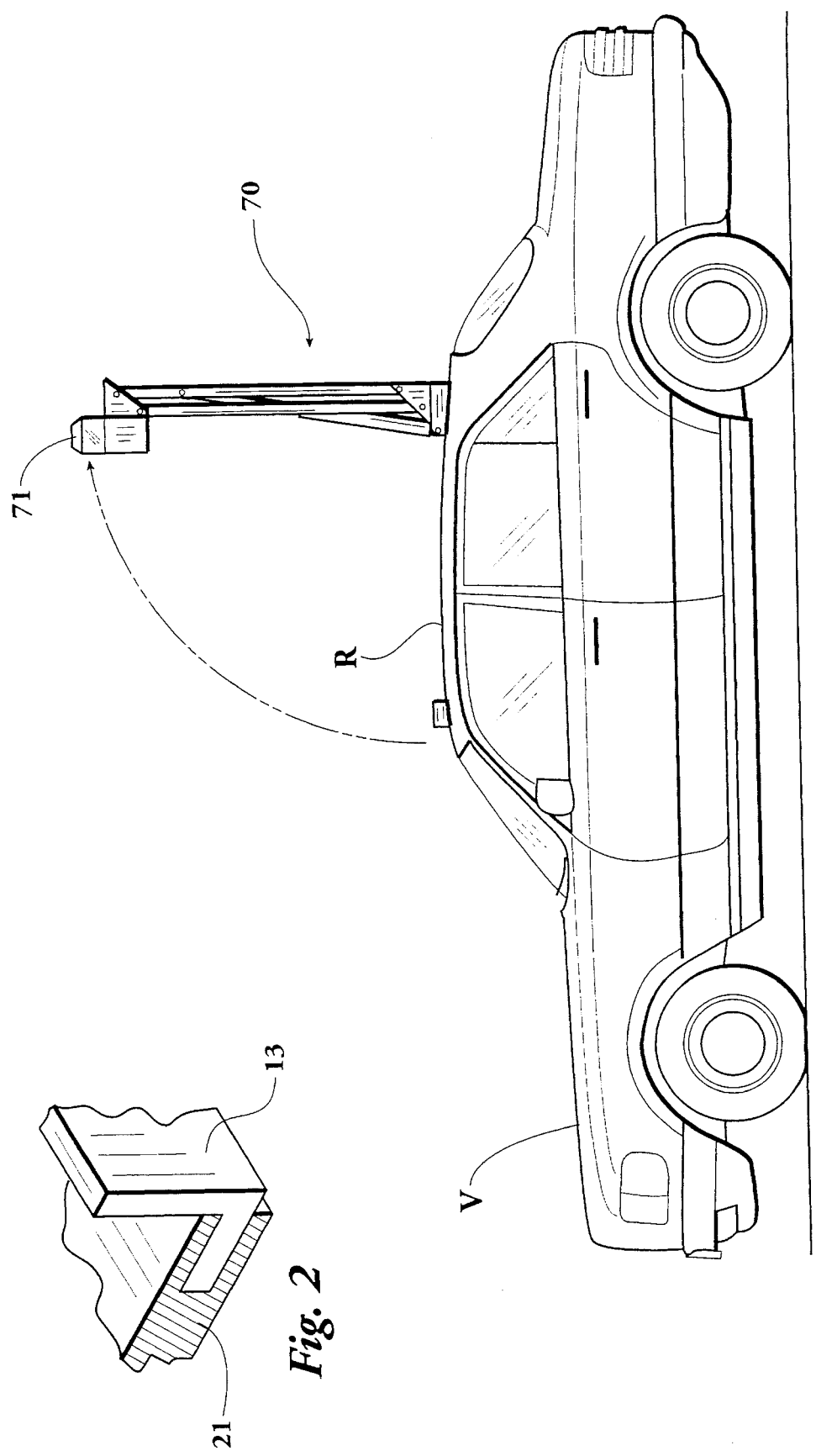

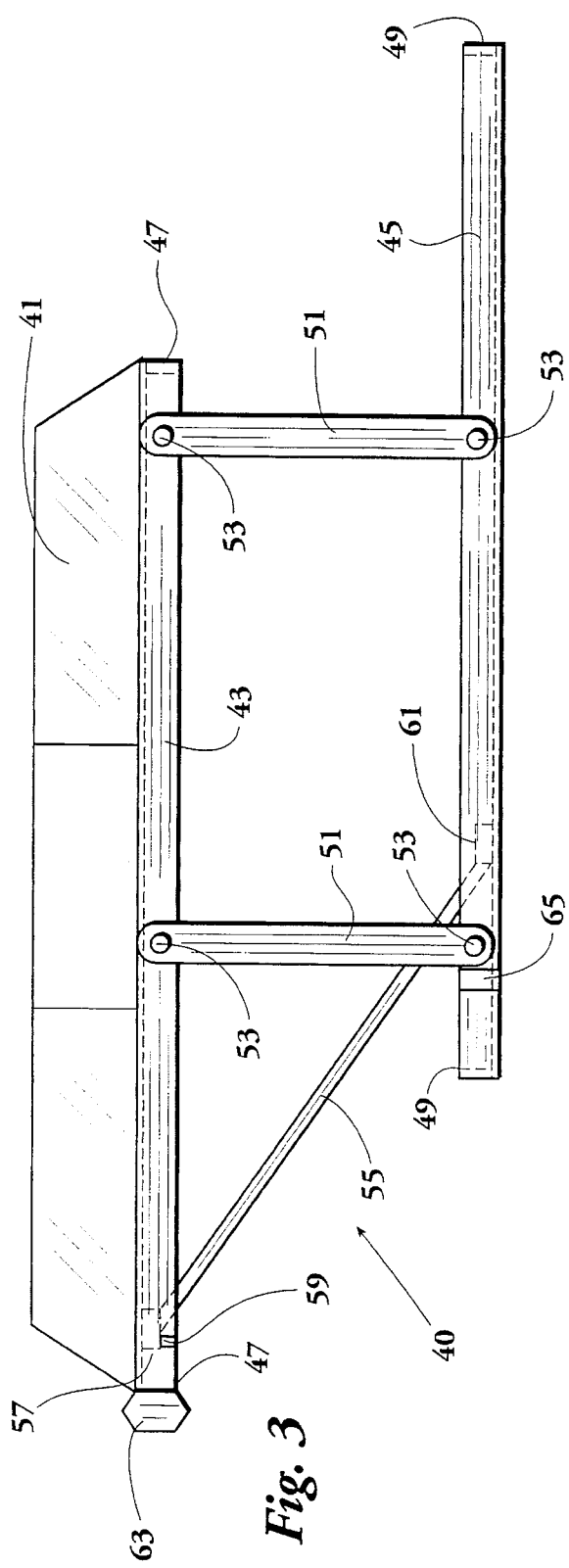
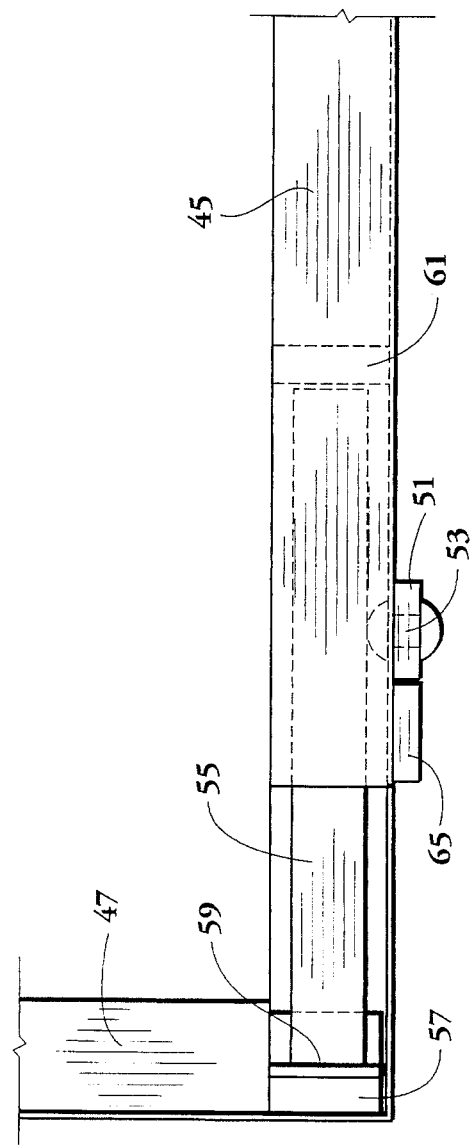

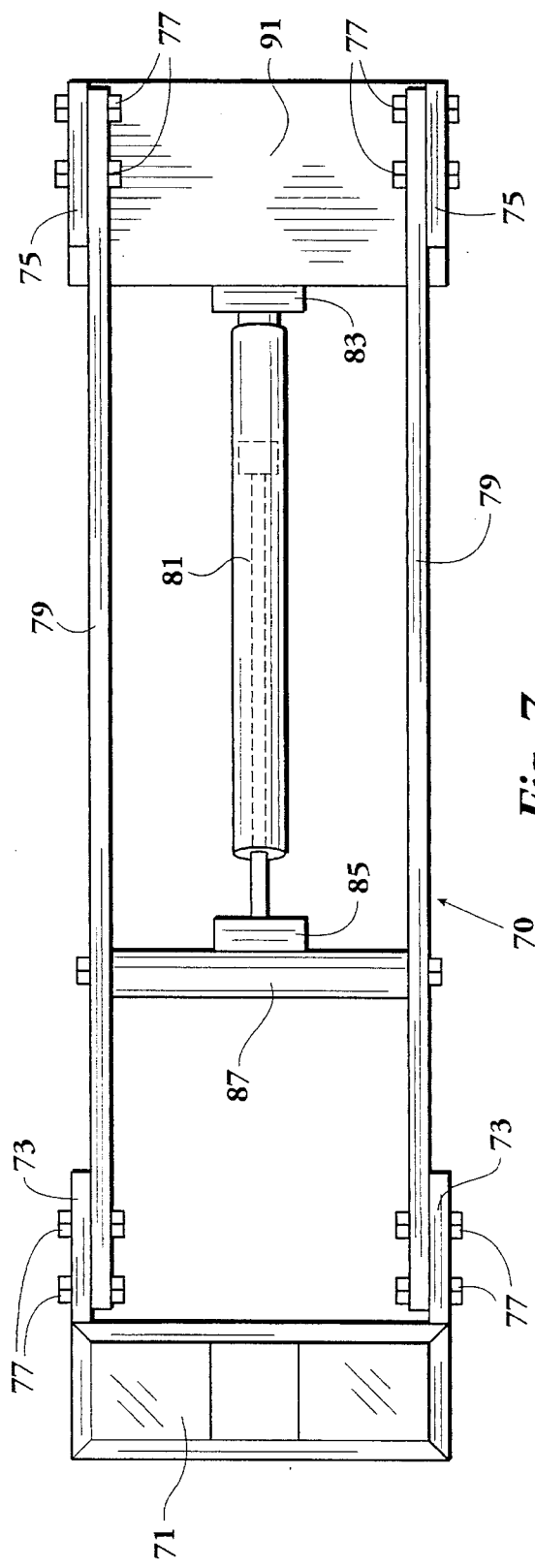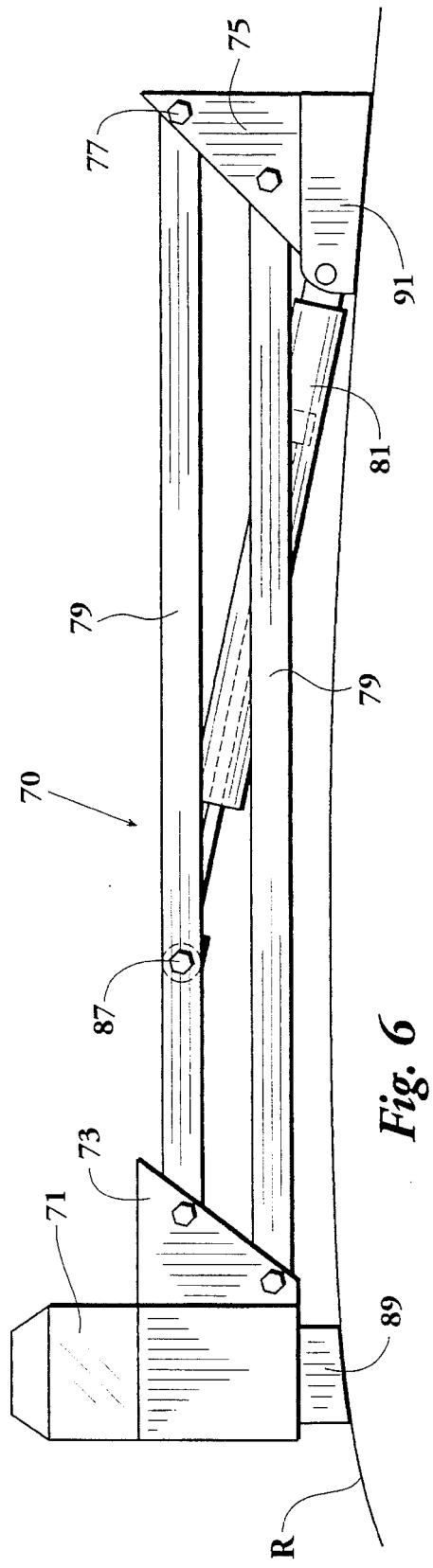

# EMERGENCY VEHICLE LIGHT BAR ASSEMBLY

BACKGROUND OF THE INVENTION

This invention relates generally to warning lights and more particularly concerns emergency lights mounted on a motor vehicle.

Presently known emergency vehicle light bars possess no satisfactory means for elevating the bar to heights permitting the emergency lights to be seen along sight lines obstructed by vehicles in the vicinity. This problem is of increasing concern with the rising popularity of pick-up trucks, vans, sport utility vehicles and other vehicles having higher than normal roofs.

While a variety of devices has been developed for the elevation of individual light fixtures above the roof level of a motor vehicle, they are generally inadequate for use with modern light bars. The device must be strong enough to dependably support the light bar, yet have a minimum vertical surface area so as not to unduly increase wind resistance. It must be simply and quickly raised and lowered, yet durable and weather proof.

Some of these known devices use telescoping tubes to support a single light fixture at varying heights. Such telescoping arrangements are neither strong enough to support a light bar nor permissive of the minimal elevations desired in the lower nonemergency or transport position. Other such devices use end pivot arrangements which are not of sufficient strength to dependably support a modern light bar and furthermore generally rotate the light fixture from a horizontal to a vertical condition as the pivoting arm of the device rotates from horizontal to vertical.

It is, therefore, an object of this invention to provide an emergency vehicle light bar assembly which permits raising and lowering of the emergency light bar in relation to the vehicle surface on which the assembly is mounted. Another object of this invention is to provide an emergency vehicle light bar assembly of sufficient strength to withstand the wind forces exerted on the assembly for any height to which the light bar may be elevated. It is also an object of this invention to provide an emergency vehicle light bar assembly having a minimal lower transport height and a maximal elevated or emergency use height. A further object of this invention is to provide an emergency vehicle light bar assembly which maintains the light bar in the same operational attitude regardless of the height to which it is elevated.

SUMMARY OF THE INVENTION

In accordance with the invention, an emergency vehicle light bar assembly is provided in which a first substantially horizontal elongated frame is mountable transversely across the upper surface of the emergency vehicle and a second substantially horizontally elongated frame is connected to the first frame, also in transverse relationship to the emergency vehicle. The connecting assembly is such that the second frame may be substantially continuously vertically displaced while maintaining parallel relationship of the frames so that the emergency indicating equipment fixed atop the second frame maintains its operational attitude regardless of the elevation to which the second frame is raised. Reciprocable operation of the connecting assembly may be accomplished by electric, hydraulic, pneumatic or manual drive systems.

In one single parallelogram embodiment, the connecting assembly consists of a plurality of parallel members of equal length each pivotally connected at one end to the first frame and at the other end to the second frame for rotation about parallel axes transverse to the frames. Thus, the longitudinal edges of the frames and the parallel members define a collapsing parallelogram maintaining the upper frame in constant substantially horizontal relationship. In this arrangement, the operating assembly will preferably consist of a handle fixed to one end of the second frame for pulling and pushing the second frame longitudinally to rotate the parallel members between a substantially horizontal position and a substantially vertical position.

In another specially preferred double parallelogram embodiment, each of the frames includes a pair of longitudinal guide members fixed in spaced relationship by a pair of end members. Each of the frames also has a pair of carriages slidably engaged for longitudinal reciprocable motion along its respective pair of guide members. Four pairs of members of equal length are provided, one pair at each corner and between the frames in an X relationship connecting each frame at its corner to the nearest carriage of the other frame. Thus, as the space between each pair of carriages is varied from a minimal space at which the pairs of members will be in substantially horizontal condition to a maximal space at which the pairs of members will be rotated toward almost a vertical condition, the second frame will be raised from its lowest or transport condition to its highest or emergency condition. In this embodiment, the preferred operating assembly is a worm drive oppositely threadedly engaged between one of the pairs of carriages and connected to a reversing electric motor enabling the carriages to be variably displaced. The driven displacement of one pair of carriages will cause the other pair of carriages to be similarly displaced as the pairs of members rotate, resulting in two opposite collapsing parallelogram relationships. This opposite parallelogram configuration provides great strength which, if desired, can be further increased by use of a pin pivotally connecting each pair of members at the crossing point of their X relationship.

In another double parallelogram embodiment of the light bar assembly, the frames are displaced horizontally in the minimal height configuration and brackets on the ends of the forward frame are connected to brackets on the ends of the rearward frame by pairs of arms of equal length in parallel relationship in vertical planes and equally offset from front to rear so as to maintain a collapsing parallelogram relationship defined by the arms and their connection points on the brackets as the arms are rotated between the horizontal and the vertical condition. Thus the light bar is maintained in its operational attitude throughout the rotational movement of the connecting arms between the horizontal and the vertical. In this embodiment, the use of a hydraulic or pneumatic system to rotate the arms is preferred.

In all of these embodiments, locking mechanisms are provided to secure the assembly in the minimal and maximal elevated conditions.

BRIEF DESCRIPTION OF THE DRAWINGS

Other objects and advantages of the invention will become apparent upon reading the following detailed description and upon reference to the drawings in which:

FIG. 2 is a partial expanded perspective view of a carriage of FIG. 1;

FIG. 3 is a front elevation view of a single parallelogram rotational displacement embodiment of the emergency vehicle light bar assembly;

FIG. 4 is a partial, expanded bottom plan view of the emergency vehicle light bar assembly of FIG. 3;

FIG. 5 is a side elevation view of a double parallelogram rotational displacement embodiment of the emergency vehicle light bar assembly mounted on a motor vehicle in its maximal elevation or emergency use condition;

FIG. 6 is a side elevation view of the emergency vehicle light bar assembly of FIG. 5 in its minimal elevation or transport condition; and FIG. 7 is a top plan view of the emergency vehicle light bar assembly of FIG. 5 in its minimal height or transport condition.

Figure 1:
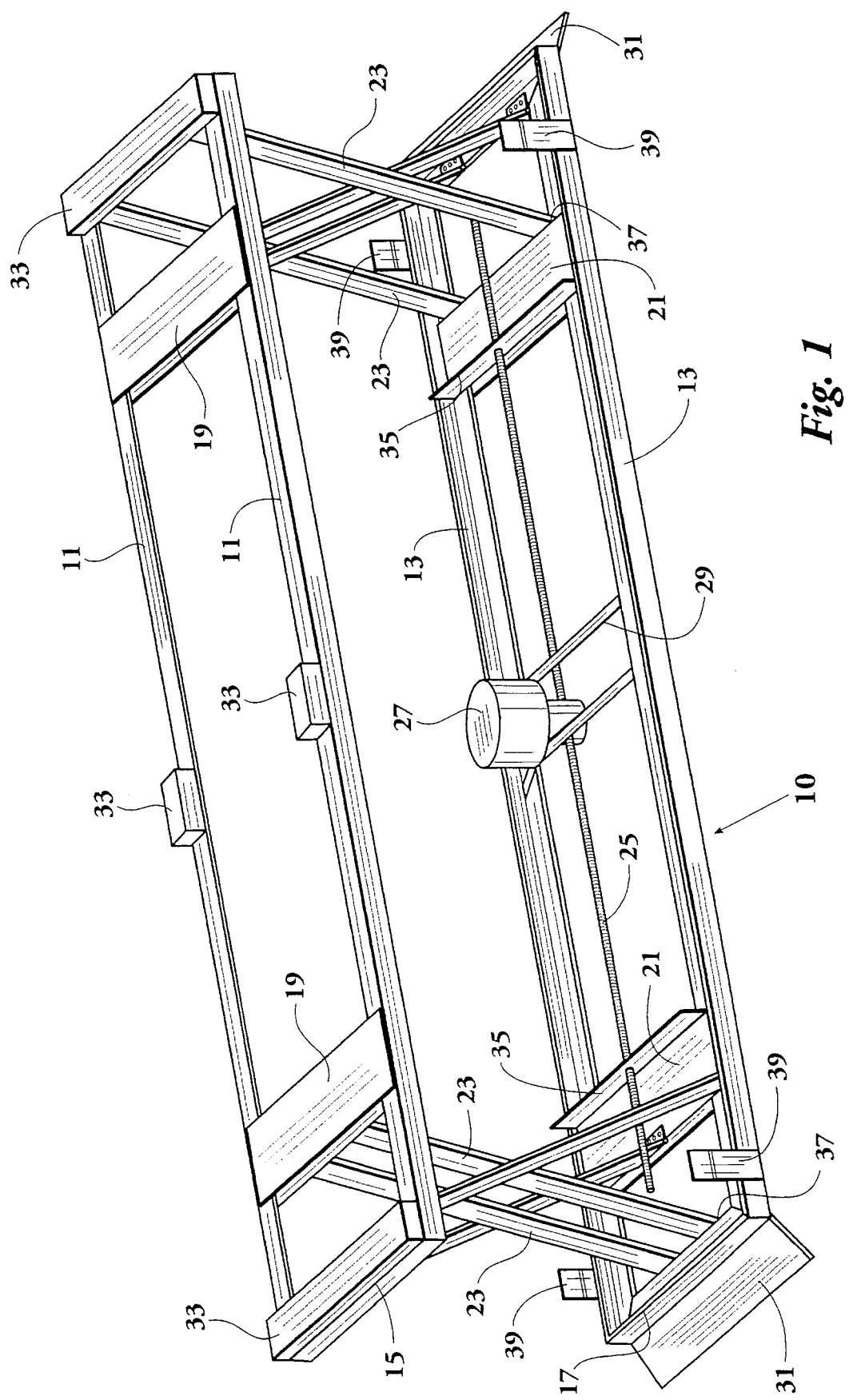
FIG. 1 is a perspective view of a double parallelogram vertical displacement embodiment of the emergency vehicle light bar assembly.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

Turning first to FIGS. 1 and 2, a double parallelogram vertical displacement embodiment of the emergency vehicle light bar assembly 10 is illustrated. Upper and lower horizontal elongated frames, preferably mirroredly opposed, are formed from parallel longitudinal guide members 11 and 13 connected by parallel end members 15 and 17, respectively. Preferably, as shown, the guide members 11 and 13 and the end members 15 and 17 are angle irons joined at their corners. A pair of carriages 19 and 21 is reciprocably, slidably mounted on tracks defined by the horizontal flange of each pair of guide members 11 and 13. As can best be seen in FIG. 2 illustrating one of the lower longitudinal guide members 13, the carriage 21 consists basically of a plate riding on the guides 13 in tongue and groove arrangement. The upper and lower frames are connected by pairs of members 23 of equal length, each member 23 being pivotally connected at one end to a corner of one of the frames on one of four fixed common parallel axes and at the other end to the nearest carriage of the other frame on one of four sliding parallel common axes. A worm drive 25 connected between one of the pairs of carriages, as shown between the lower pair of carriages 21, is oppositely threaded at its ends so that rotation of the worm drive 25 in one direction causes the carriages 21 to be drawn into closer proximity while rotation in the opposite direction causes the carriages 21 to be driven apart. Preferably, a reversing motor 27, as shown mounted to the lower frame of the assembly by an appropriate motor mount 29, is geared to the worm drive 25 to rotate the worm drive 25 in either direction.

As shown, the end members 17 of the lower frame may be further provided with flanges 31 to facilitate spacing of the lower frame slightly above the roof of the vehicle (not shown) so as to permit sliding of the lower carriages 21 along the lower guide members 13. In addition, spacers 33 are preferably provided above the end members 15 and also preferably above intermediate points on the longitudinal upper members 11. The spaces 33 facilitate mounting of a light bar, such as the light bar 41 illustrated in FIG. 3, slightly above the upper guide members 11 so as to permit sliding of the upper carriages 19 along the upper guide members 11. As shown, the carriages to which the worm drive 25 is mounted are provided with worm drive mounts such as vertical plates 35 having threaded apertures for engaging with the worm drive 25. Preferably, the pairs of pivotally mounted members 23 will be connected by hinges 37, though pins or other pivotal arrangements could be employed. Either frame may also be fitted with spring clips 39 which will engage with the other frame to lock the assembly in a closed condition.

In operation, as the carriages 21 are drawn into closer proximity by rotation of the worm drive 25 in one direction, the members 23 connected to the worm driven carriages 21 pivot toward the horizontal and the frame is pulled into closer substantially parallel vertical displacement. This causes the other carriages 19 to also be driven into closer proximity because the members 23 connecting the other carriages 19 to the opposite frame must also rotate toward a more horizontal condition. By operation of the motor 27 and therefore the worm drive 25 in the reverse direction, the worm driven carriages 21 are pushed further apart and the opposite frame is pushed upwardly. The other carriages 19 are also pulled further apart as their connecting members 23 approach a more vertical condition. The worm drive 25 also serves to lock the upper frame at the selected elevation. The connecting members 23 rotate in range of less than 90 degrees from a substantially horizontal position to a position short of vertical. In this double parallelogram arrangement, each parallelogram is defined by diagonally opposite pivot points at opposite ends of opposing frames and at their furthermost carriages, that is by two sets of parallel fixed and sliding axes. This configuration provides an assembly of strength suitable to support the light bar at relatively high elevations in adverse conditions.

Turning now to FIGS. 3 and 4, a single parallelogram rotational displacement embodiment of the emergency vehicle light bar assembly is illustrated. In this embodiment, the light bar 41 is mounted on an upper frame, preferably consisting of longitudinal 43 and end 41 members, such as angle irons, and a lower frame is formed from a similar but preferably mirroredly opposite arrangement of longitudinal 45 and end 49 members. As shown, the upper and lower frames are connected along parallel axes transverse to the frames by parallel members 51 of equal length pivotally connected to the vertical flanges of the upper and lower longitudinal angle irons 43 and 45 by pins 53 so that the pins 53 define a collapsing parallelogram. A locking rod or member 55 is pivotally connected at one end to a plate 57 by a hinge 59, the plate 57 being fixed proximate an end of one of the frames, as shown proximate one end of the upper frame. A stationary block 61, mounted on the opposite frame of the assembly is positioned so that, when the parallel members 51 are rotated to a substantially vertical condition, the free end of the locking member 55 can be abutted against the stationary block 61. A handle 63, as shown fixed at the end of the upper frame proximate which the locking member 55 is hinged, enables the user to pull the upper frame horizontally in relation to the lower frame, thus causing the parallel members 51 to rotate to the vertical and horizontally displace the upper frame to its maximum height. At least one stopping block 65, as shown mounted on the lower frame, is positioned to prevent an associated parallel member 51 from rotating beyond the vertical. When the upper frame has been rotated until the parallel members 51 are vertical and the stopping block 65 prevents further rotation beyond the vertical, the free end of the locking member 55 is abutted against the stationary block 61 to prevent rotation of the parallel members 51 back along their original path. Thus, the upper frame is locked in its maximum elevation condition. To return the light bar 41 to its lower position, the locking member 55 is disengaged from the stationary block 61 and the handle 63 pushed to cause the parallel members 51 to rotate back to the substantially horizontal condition in which the upper frame of the assembly will rest on the lower frame of the assembly. The light bar 41 maintains the same attitude throughout the rotation of the parallel member 51. As shown in FIG. 1, spring clips 39 may also be employed in this embodiment to secure the upper and lower frames in the closed condition.

Turning now to FIGS. 5 through 7, a double parallelogram rotational displacement embodiment of the emergency vehicle light bar assembly is illustrated. In this arrangement, the light bar 71 is mounted on a first pair of brackets 73. A second pair of brackets 75 is mounted rearwardly of the first brackets on the roof R of the vehicle V. Pivot pins 77 connect pairs of arms 79 between opposite pairs of front and rear brackets 73 and 75 in a vertical parallelogram relationship. Thus, as the arms 79 pivotally rotate on the rear bracket 75, the front brackets 73 are arcuately displaced about the rear bracket 75 while the light bar 71 maintains a constant upright attitude throughout the rotation of the arms 79. A pneumatic or hydraulic cylinder 81 is pivotally connected at one end 83 to a fixed bracket assembly 75 and at its other end 85 to a brace 87 horizontally connected between two of the arms 79 to drive the arms 79 on their reciprocal arcuate path. The cylinder 81 also serves to lock the assembly at any point desired along the path. As shown, a rest member 89 may be mounted on the forward roof portion of the vehicle V in a position to support the forward bracket and light bar 71 when the light bar 71 is in its lowermost position. Similarly, the rear bracket 75 can be secured to the vehicle V by use of a mount 91 contoured to suit the configuration of the roof R.

Thus, it is apparent that there has been provided, in accordance with the invention, an emergency vehicle light bar assembly that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A light bar assembly for an emergency vehicle comprising:

a first substantially horizontal elongated frame mountable transversely across an upper surface of the emergency vehicle;

a second substantially horizontal elongated frame substantially aligned with said first frame;

means connecting said first and second frames for substantially continuously parallel vertical displacement of said second frame above said first frame;

an arrangement of emergency indicating equipment fixed atop said second frame; and means for reciprocably operating said connecting means to raise and lower said second frame in relation to said first frame.

2. An assembly according to claim 1, said connecting means comprising a plurality of parallel members of equal length each pivotally connected at one end to said first frame and at another end to said second frame for rotation about parallel axes transverse to said frames.

3. An assembly according to claim 2, said operating means comprising means fixed to said second frame for pulling and pushing said second frame longitudinally to rotate said members between a substantially horizontal position and a substantially vertical position.

4. An assembly according to claim 3 further comprising means for locking said members in said substantially vertical position.

5. An assembly according to claim 4 further comprising means for locking said members in said substantially horizontal position.

6. An assembly according to claim 1, each of said frames comprising a pair of longitudinal guide members fixed in spaced relationship by a pair of end members.

7. An assembly according to claim 6, said connecting means comprising:

two pairs of carriages, one pair slidably engaged for reciprocable longitudinal motion on each said pair of guide members of each said frame; and four pairs of members of equal length, a first pair of said members each pivotally connected at one end to said first frame proximate one end thereof for rotation about a first fixed common axis transverse to said frames and at another end to one of said second frame carriages for rotation about a first sliding common axis transverse to said frames, a second pair of said members each pivotally connected at one end to said first frame proximate another end thereof for rotation about a second fixed common axis transverse to said frames and at another end to another of said second frame carriages for rotation about a second sliding common axis transverse to said frames, a third pair of said members each pivotally connected at one end to said second frame proximate one end thereof for rotation about a third fixed common axis transverse to said frames and at another end to one of said first frame carriages for rotation about a third sliding common axis transverse to said frames, and a fourth pair of said members each pivotally connected at one end to said second frame proximate another end thereof for rotation about a fourth fixed common axis transverse to said frames and at another end to another of said first frame carriages for rotation about a fourth sliding common axis transverse to said frames.

8. An assembly according to claim 7, said operating means comprising:

means for interconnecting one of said pairs of carriages in variable spaced apart relationship; and means for driving said interconnecting means between a first condition in which said pairs of carriages are minimally spaced apart and said pairs of members are substantially horizontal and a second condition in which said pairs of carriages are maximally spaced apart and said pairs of members have rotated less than 90 degrees.

9. An assembly according to claim 8 further comprising means for locking said interconnected pair of carriages in selected spaced apart relationship.

10. A light bar assembly for an emergency vehicle comprising:

a pair of mirroredly opposed identical rectangular elongated frames of angle irons providing inwardly extending horizontal tracks and inwardly extending vertical flanges, a lower of said frames being mountable transversely across an upper surface of the emergency vehicle and an upper of said frames having an arrangement of emergency indicating equipment fixed thereabove;

two pairs of carriage plates, each said plate having channels in two opposite edges thereof, one pair of plates having said channels thereof slidably engaged for reciprocable longitudinal motion on longitudinal ones of said tracks of one of said frames;

four pairs of members of equal length, a first pair of said members each pivotally connected at one end to said lower frame proximate one end thereof for rotation about a first fixed common axis transverse to said frames and at another end to one of said upper frame plates for rotation about a first sliding common axis transverse to said frames, a second pair of said members each pivotally connected at one end to said lower frame proximate another end thereof for rotation about a second fixed common axis transverse to said frames and at another end to another of said upper frame plates for rotation about a second sliding common axis transverse to said frames, a third pair of said members each pivotally connected at one end to said upper frame proximate one end thereof for rotation about a third fixed common axis transverse to said frames and at another end to one of said lower frame plates for rotation about a third sliding common axis transverse to said frames, and a fourth pair of said members each pivotally connected at one end to said upper frame proximate another end thereof for rotation about a fourth fixed common axis transverse to said frames and at another end to another of said lower frame plates for rotation about a fourth sliding common axis transverse to said frames;

means for interconnecting one of said pairs of plates in variable spaced apart relationship; and means for driving said interconnecting means between a first condition in which said pairs of plates are minimally spaced apart and said pairs of members are substantially horizontal and a second condition in which said pairs of carriages are maximally spaced apart and said pairs of members have rotated less than 90 degrees.

11. An assembly according to claim 10 further comprising means for locking said interconnected pair of carriages in selected spaced apart relationship.

12. An assembly according to claim 10, said interconnecting means comprising:

a pair of opposing vertical plates, one extending inwardly from each of said carriage plates of one of said frames; and a shaft oppositely threaded on each end thereof, each end of said shaft being threadedly engaged with one of said vertical plates.

13. An assembly according to claim 12, said driving means comprising a reversible electric motor.

* * * * *